United States Patent
Li et al.

(10) Patent No.: US 11,805,734 B2
(45) Date of Patent: Nov. 7, 2023

(54) MULTI-LAYER SEGMENTATION/STALK CUTTER DEVICE FOR FIRST SEASON OF DOUBLE-CROP RICE AND CONTROL METHOD, AND COMBINE HARVESTER FOR FIRST SEASON OF DOUBLE-CROP RICE

(71) Applicant: JIANGSU UNIVERSITY, Zhenjiang (CN)

(72) Inventors: Yaoming Li, Zhenjiang (CN); Anya Chen, Zhenjiang (CN); Mingsen Huang, Zhenjiang (CN); Jiasheng Li, Zhenjiang (CN); Hanhao Wang, Zhenjiang (CN)

(73) Assignee: JIANGSU UNIVERSITY, Jiangsu (CN)

( * ) Notice: Subject to any disclaimer, the term of this patent is extended or adjusted under 35 U.S.C. 154(b) by 567 days.

(21) Appl. No.: 16/976,113

(22) PCT Filed: Dec. 20, 2019

(86) PCT No.: PCT/CN2019/126814
§ 371 (c)(1),
(2) Date: Aug. 27, 2020

(87) PCT Pub. No.: WO2020/135239
PCT Pub. Date: Jul. 2, 2020

(65) Prior Publication Data
US 2020/0404843 A1   Dec. 31, 2020

(30) Foreign Application Priority Data

Dec. 27, 2018   (CN) .......................... 201811607909.8
Dec. 27, 2018   (CN) .......................... 201811609392.6
Sep. 23, 2019   (CN) .......................... 201910899203.1

(51) Int. Cl.
*A01D 45/04*   (2006.01)
*A01D 41/02*   (2006.01)
(Continued)

(52) U.S. Cl.
CPC ............ *A01D 45/04* (2013.01); *A01B 63/008* (2013.01); *A01D 41/02* (2013.01); *A01D 41/06* (2013.01);
(Continued)

(58) Field of Classification Search
CPC .... A01D 34/8355; A01D 45/04; A01D 47/00; A01D 45/06; A01D 45/065
See application file for complete search history.

(56) References Cited

U.S. PATENT DOCUMENTS 5,463,857 A * 11/1995 Blosser ................ A01D 34/035
56/238
5,600,943 A *  2/1997 Ryan ................... A01D 34/661
56/2
(Continued)

FOREIGN PATENT DOCUMENTS

CN        201403321 Y      2/2010
CN        201630001 U   * 11/2010
(Continued)

OTHER PUBLICATIONS

International Search Report issued in PCT/CN2019/126814, dated Mar. 9, 2020.

*Primary Examiner* — Adam J Behrens
*Assistant Examiner* — Madeline I Runco
(74) *Attorney, Agent, or Firm* — Heslin Rothenberg Farley & Mesiti, P.C.

(57) ABSTRACT

A multi-layer segmentation/stalk cutter device for a first season of double-crop rice and a control method, and a combine harvester for a first season of double-crop rice, the multi-layer segmentation/stalk cutter device comprising: a cutting platform, a segmenting cutter and a stalk cutter, at least one segmenting cutter being disposed at a lower rear portion of the cutting platform, the segmenting cutter being hinged on a moving chassis, and a second execution mecha-
(Continued)

nism controlling the cutting height of the segmenting cutter; the stalk cutter being disposed at a lower rear portion of the segmenting cutter, the stalk cutter being hinged on the moving chassis, and a third execution mechanism controlling the cutting height of the stalk cutter.

20 Claims, 17 Drawing Sheets

(51) Int. Cl.
  *A01D 41/06* (2006.01)
  *A01D 41/12* (2006.01)
  *A01D 41/127* (2006.01)
  *A01D 75/02* (2006.01)
  *A01B 63/00* (2006.01)
(52) U.S. Cl.
  CPC ..... *A01D 41/1252* (2013.01); *A01D 41/1276* (2013.01); *A01D 75/02* (2013.01)

(56) References Cited

U.S. PATENT DOCUMENTS

| | | | | |
|---|---|---|---|---|
| 9,788,486 | B2 * | 10/2017 | Magisson | .............. A01D 41/14 |
| 10,292,333 | B2 * | 5/2019 | Missotten | ............ A01D 41/144 |
| 2013/0091819 | A1 | 4/2013 | Deneault et al. | |
| 2016/0183460 | A1 * | 6/2016 | Missotten | ............ A01D 41/145 56/229 |
| 2017/0150678 | A1 * | 6/2017 | Li | ............................ A01F 12/10 |
| 2023/0026343 | A1 * | 1/2023 | Dillon | .................... A01D 57/04 |

FOREIGN PATENT DOCUMENTS

| | | | | | |
|---|---|---|---|---|---|
| CN | 202476100 | U | | 10/2012 | |
| CN | 103782719 | A | * | 5/2014 | |
| CN | 107509452 | A | * | 12/2017 | |
| CN | 107736125 | A | | 2/2018 | |
| CN | 108076790 | A | * | 5/2018 | |
| CN | 108551847 | A | * | 9/2018 | |
| CN | 109379972 | A | * | 2/2019 | ............ A01D 34/02 |
| CN | 109566069 | A | * | 4/2019 | |
| DE | 3606030 | A1 | * | 8/1986 | |
| DE | 102005025319 | A1 | * | 12/2006 | ............ A01D 34/83 |
| DE | 102005025319 | B4 | * | 5/2014 | ............ A01D 34/83 |
| EP | 0212185 | A1 | * | 3/1987 | |
| FR | 2730126 | A1 | * | 8/1996 | ......... A01D 34/8355 |
| FR | 2794608 | A1 | * | 12/2000 | ......... A01D 34/8355 |
| KR | 20100079719 | A | * | 7/2010 | |
| WO | WO-2013111639 | A1 | * | 8/2013 | ............ A01D 34/30 |
| WO | WO-2015182195 | A1 | * | 12/2015 | ............ A01D 34/24 |
| WO | WO-2018053897 | A1 | * | 3/2018 | |

\* cited by examiner

MULTI-LAYER SEGMENTATION/STALK CUTTER DEVICE FOR FIRST SEASON OF DOUBLE-CROP RICE AND CONTROL METHOD, AND COMBINE HARVESTER FOR FIRST SEASON OF DOUBLE-CROP RICE

CROSS REFERENCE TO RELATED APPLICATIONS

This application is a U.S. National Phase filing under 35 U.S.C. § 371 of International Application PCT/CN2019/126814, filed Dec. 20, 2019. PCT/CN2019/126814 claims priority from Chinese Patent Application Number 201811609392.6, filed Dec. 27, 2018, and Chinese Patent Application Number 201811607909.8, filed Dec. 27, 2018, and Chinese Patent Application Number 201910899203.1, filed Sep. 23, 2019. The entire contents of each of these applications are hereby expressly incorporated herein by reference.

TECHNICAL FIELD

The present invention relates to the field of agricultural machinery or the field of ratoon rice machinery, in particular to a multi-layer segmented-stubble cutter device for the first season ratoon rice and control method thereof and a combined harvester for the first season ratoon rice.

BACKGROUND ART

Ratoon rice is a special rice planting mode, suitable for areas where sunlight and heat are not enough to plant double-season rice, but are surplus for a single-season rice cultivation, and has advantages of saving labor, seed, water, fertilizer, medicine, seedlings, etc., thus is an important measure to increase the land multiple cropping index and ensure food security in China, and has great prospects for promotion in China. The harvest period of ratoon rice is divided into two seasons. When the first season rice is harvested, the lower third of the plant (rice stubble and root system) must be retained. After fertilization and cultivation, it can grow another season rice. At present, the harvest of the first season of ratoon rice mainly depends on manual harvesting or the use of existing harvesters. The main problems are: manual harvesting is time-consuming and labor-consuming, while the existing harvesters have the problems such as high rolling rate (40% -50%) and large damage to rice stubble during harvesting, which have severely restricted the popularization of ratoon rice.

Chinese patent discloses a four-drive low-roller ratoon rice harvester, which includes a high-gap four-drive chassis, a header, a conveying part, a threshing part and a grain box. Although this invention reduces the rolling rate and the damage to the rice stubble by the paddy narrow wheel and the high-gap four-drive chassis, the work efficiency is low; Chinese patent discloses a ratoon rice harvester with variable-pitch driving wheels, which includes a chassis. The front end of the chassis is provided with a pair of front wheels, and the rear end of the chassis is provided with a pair of rear wheels. Telescopic mechanisms for controlling the lateral movement of the corresponding front wheels are provided on both sides of the bottom of the front end of the chassis. A header and a threshing device are provided on the front end of the chassis. Although this invention realizes the avoidance of the rice stubble by adjusting the driving wheels, the work efficiency is low as it cannot meet the needs of various production situations due to the use of ordinary walking wheels and the machine is not provided with a grain box.

CONTENTS OF THE INVENTION

In view of the shortcomings in the prior art, the present invention provides a multi-layer segmented-stubble cutter device for first season ratoon rice and control method thereof and a combined harvester for first season ratoon rice, which can well adapt to the harvesting requirements of ratoon rice by a header, a segmenting cutter and a stubble cutter, realize the harvesting of ears with only a few stalks, and ensure the height of rice stubble, which can greatly reduce the sizes of the combine harvester header, the auger and the conveying groove, to enable miniaturization and lightweight design of the combined harvester.

The present invention achieves the above technical objectives through the following technical means.

A multi-layer segmented-stubble cutter device for first season ratoon rice includes a header, a segmenting cutter and a stubble cutter. The header is used to cut the ear of the ratoon rice, and at least one segmenting cutter is located at the lower rear of the header, and the segmenting cutter is hinged on a walking chassis. The cutting height of the segmenting cutter is controlled by a second actuator, for cutting the returning field stalks and returning the same to the field after reducing their length. The stubble cutter is located at the lower rear of the segmenting cutter, and the stubble cutter is hinged on the walking chassis. The cutting height of the stubble cutter is controlled by a third actuator for cutting the stalks above the stubbles.

Further, it includes a panicle layer image acquisition device, a cutter height detection component, and a cutter height control system;

The panicle layer image acquisition device is used to acquire an image of ratoon rice;

The cutter height detection component includes several sensors for detecting the cutting heights of the header, the segmenting cutter and the stubble cutter in real time, respectively;

The cutter height control system determines the ear cutting height by analyzing the image of ratoon rice; the stubble stalk height is determined manually, and the cutter height control system determines the cutting height of the returning field stalk based on the ear cutting height and the stubble stalk height; the cutter height control system controls the header, the segmenting cutter and the stubble cutter to reach the corresponding cutting height through the actuator.

Further, an anti-collision block is installed on the stubble cutter to prevent collision due to the small distance between the segmenting cutter and the stubble cutter.

Further, the several sensors are angle sensors for detecting the installation angles of the header, the segmenting cutter and the stubble cutter, respectively; the cutter height control system can determine the cutting heights of the header, the segmenting cutter and the stubble cutter, based on the installation angles of the header, the segmenting cutter and the stubble cutter and the turning radius of the header, the segmenting cutter and the stubble cutter.

A combined harvester for the first season of ratoon rice includes the multi-layer segmented-stubble cutter device.

Further, the combined harvester further includes a threshing and crushing drum and a disc throwing device. The threshing and crushing drum includes a feeding section, a threshing section and a crushing section; the threshing section is used to form a threshing chamber with a concave screen; the header is connected to the feeding section, for feeding ratoon rice to the threshing chamber. The crushing section is located at the tail of the threshing section, for crushing the stalks. The feeding section, threshing section and crushing section are coaxially installed on the drum shaft; the disc throwing device is located at the output end of the crushing section, for throwing the crushed grass to both sides of the threshing and crushing drum.

Further, the disc throwing device includes a throwing disc assembly, a throwing output shaft, a throwing input shaft, and a throwing rack; a throwing disc is provided on the throwing rack, and the throwing output shaft and the throwing input shaft of the throwing disc assembly are drive-connected, for rotating the throwing disc assembly around the throwing output shaft; the throwing input shaft is installed on the throwing rack.

Further, the throwing rack is equipped with two throwing disc assemblies which rotate in opposite directions; the throwing disc assembly includes a reinforcing rib, a throwing disc side plate, and a throwing disc, and the throwing disc is fixedly connected to the throwing output shaft; the throwing disc side plates are evenly arranged on the throwing disc, and the rib is provided on the throwing disc side plate; the throwing output shaft is engaged with the throwing input shaft through a bevel gear.

Further, the combined harvester further includes an adjustable top cover of a guide plate, the adjustable top cover of the guide plate includes a guide section and a fixed cutter section, the guide section includes a front flip plate and a guide adjustment plate; the front flip plate is located above the feeding section, for guiding the material into the threshing section; the guide adjustment plate is located above the threshing section, for guiding the material into the crushing section, and the angle between the guide adjustment plate and the axis of the threshing and crushing drum is changed by external force; the fixed cutter section includes a fixed cutter assembly, and the fixed cutter assembly and the grass moving cutter assembly are arranged in a staggered manner, for cutting the stalks with the grass moving cutter assembly.

Further, the guide adjustment plate includes guide plates, sliding plates, and adjustment plates; one end of each of the plurality of guide plates is hinged inside the housing of the adjustable top cover of the guide plate, and the other end of each of the plurality of guide plates is hinged with the sliding plate respectively; the sliding plate can be slidably installed in the housing of the adjustable top cover of the guide plate; the adjustment plate is connected to any one of the guide plates, and the adjustment plate is rotated by external force to change angle between the plurality of guide plates and the axis of the threshing and crushing drum.

Further, the combined harvester further includes a double-cylinder screen cleaning device, which includes a double-cylinder screen and a double-outlet cleaning fan. The lower air outlet of the double-outlet cleaning fan is located in the front of the double-cylinder screen, for blowing large residues out of the machine in conjunction with the double-cylinder screen; the upper air outlet of the double-outlet cleaning fan is located above the double-cylinder screen, for blowing the light residues discharged by the threshing device out of the machine directly.

Further, the combined harvester further includes a grain sliding plate and a shaking plate, which divide the cleaning chamber into an upper clearing area and a lower clearing area, and the upper clearing area is used to directly blow the light residues discharged by the threshing device out of the machine; the lower cleaning area is used to blow large residues out of the machine.

Further, the grain sliding plate and the shaking plate which form a funnel shape are provided between the double-cylinder screen and the threshing device; one end of the grain sliding plate is located below the upper air outlet of the cleaning fan, and the other end of the grain sliding plate extends to the edge of the double-cylinder screen; one end of the shaking plate is located below the other end of the threshing device, and the other end of the shaking plate is located above the double-cylinder screen; a vibrating mechanism is provided on one end of the shaking plate, for shaking the shaking plate in an angle between 10° and 25° with the horizontal plane.

Further, a first guide strip is provided on the grain sliding plate, for guiding materials accumulated on both sides of the grain sliding plate to the middle; and a second guide strip is provided on the shaking plate, for making the blanking amount of the shaking plate uniform in width.

Further, the second guide strip divides the blanking opening of the shaking plate into a first blanking opening and a second blanking opening; a width ratio of the first blanking opening and the second blanking opening is 3:2-2:1; the angle between the second guide strip and the horizontal direction is 20°-40°.

Further, the header is provided with an anti-forward tilting reel, and the anti-forward tilting reel includes a wheel shaft, a pentagonal wheel frame and a reel element for first stubble; the several pentagonal wheel frames are evenly installed on the wheel shaft; the reel element for first stubble includes a reel rod, a reel board and a reel rake teeth, and the several reel rods are connected between adjacent pentagonal wheel frames; the several reel rake teeth are evenly distributed along the axial direction below the reel rod, and the reel board is fixed on the reel rod in the radial direction, for preventing the forward tilting of the first stubble after cutting.

Further, the walking chassis is a crawler-type walking chassis, and a crawler body of the crawler-type walking chassis is provided with a narrow pattern having a width smaller than that of the crawler body.

Further, the narrow pattern is located in the middle of the crawler body, and the narrow pattern divides the rice stubble low-loss crawler body into a rolling section and a low-loss section in the width direction, and the rolling section is used to provide traction; the low-loss section is used to reduce the ground specific pressure;

Further, the width of the low-loss crawler body is in the range of 300-400 mm; the ratio of the length of the rolling section to the length of the low-loss section is not less than 7:3.

Further, the combined harvester further includes a grass stick, which is adjustable in height and installed on the walking chassis, for dropping the stalk that fell on the stubble to the ground after cutting, in order to prevent it from affecting the growth of rice in the regeneration season.

A control method of a multi-layer segmented-stubble cutter device includes the following steps:
  Acquiring a ratoon rice image, and determining an ear cutting height $b_1$ according to the ratoon rice image based on the image processing method;
  Determining the height $b_3$ of the stubble stalk by sampling on site and measuring the average height of the second section of the ratoon rice;

Determining the cutting height b2 of the returning field stalk according to the ear cutting height b1 and the height b3 of the stubble stalk;

Controlling the header to the ear cutting height b1 by the first actuator and several sensors;

Controlling the segmenting cutter to the cutting height b2 of the returning field stalk by the second actuator and several sensors;

Controlling the stubble cutter to the height b3 of the stubble stalk by the third actuator and several sensors.

The beneficial effects of the present invention are:

1. The multi-layer segmented-stubble cutter device for the first season ratoon rice according to the present invention uses a header, a segmenting cutter and a stubble cutter, the header cuts the ear of the ratoon rice, the segmenting cutter cuts the returning field stalk, and the stubble cutter cuts stalk above the stubble, which can achieve the harvesting of the ears with only a few stalks, while ensuring the height of the stubble of the rice.
2. The multi-layer segmented-stubble cutter device for the first season ratoon rice according to the present invention obtains the image of the ratoon rice through the panicle layer image acquisition device, the cutter height detection component detects the corresponding cutting height of the header, the segmenting cutter and the stubble cutter, and the cutter height control system controls the corresponding cutting position of the header, the segmenting cutter and the stubble cutter.
3. The multi-layer segmented-stubble cutter device for the first season ratoon rice according to the present invention, the segmenting cutter and the stubble cutter are installed on a walking chassis, which has high stability, high reliability and function of fast installation and disassembly, and can realize the common harvesting use of ordinary rice harvester and ratoon rice harvester.
4. The multi-layer segmented-stubble cutter device for the first season ratoon rice according to the present invention controls the operation heights of the header, the segmenting cutter and the stubble cutter separately through the actuators, and the cutting operations do not interfere and influence with each other. And during the harvesting operation, the height of the stubble of the first season ratoon rice can be determined and adjusted according to the different varieties of ratoon rice and the different harvest conditions of the field.
5. The combined harvester for the first season ratoon rice according to the present invention adopts a multi-layer segmented-stubble cutter device for the first season ratoon rice, a conveying groove, a threshing and throwing integrated device, a double-cylinder screen cleaning device, a walking chassis, a grass stick, a gearbox and a cab, which can realize the processes of cutting, threshing and cleaning for only a few ears, and at the same time, it is easy for stubble and the returning field stalk will not be too long, thus this not only saves power consumption, but also makes the whole machine to develop towards miniaturization and lightweight.
6. The combined harvester for the first season ratoon rice according to the present invention greatly increases the rice yield in the regeneration season through a cutting range of 2-2.6 m of a header, a width range of 400-300 mm of a crawler, reducing the rolling rate to 35-23%, and reducing the rolling rate by 15-25% relative to the ordinary harvester.
7. The combined harvester for the first season ratoon rice according to the present invention, the header is designed for the operation of the ear with only a few stalks. The small-diameter auger and the anti-forward tilting reel are small in size, and the work efficiency is high.
8. The threshing and throwing integrated device according to the present invention adopts the adjustable top cover of the guide plate to cooperate with the threshing and crushing drum, and function sections thereof are clear, which improves the threshing process of the ratoon rice. The moving cutter is added to the threshing and crushing drum, the fixed cutter is added to the adjustable top cover of the guide plate, and the moving cutter and the fixed cutter are operated together, which has a good cutting effect on the small stalks of the harvesting ear only; while adjusting the angle between the guide plate and the axis of the threshing and crushing drum can adapt to different threshing environments to achieve better threshing results, and at the same time, make the material better enter the fixed cutter section.
9. The threshing and throwing integrated device according to the present invention makes the stalks crushed by the threshing device to be evenly thrown among the fields by the disc throwing device, to ensure that the stalks do not accumulate on the rice stubble of ratoon rice, which improves the quality of living environment of ratoon rice, and thereby improves the secondary growth effect of ratoon rice, and at the same time achieves a better effect for returning stalks to the field, increases soil fertility, and has an important effect on increasing the yield of ratoon rice.
10. The double-cylinder screen selecting device according to the present invention makes full use of the limited vertical space between the threshing device and the selecting mechanism for preliminary air selection through the double-outlet selecting fan, which can reduce the design power of the cylindrical screen and reasonably use the fan to blow the light residues out of the machine directly, without throwing through a cylindrical screen.
11. The double-cylinder screen cleaning device according to the present invention, the grain distribution of the threshed mixtures from the longitudinal axial flow threshing device is that the grain content gradually decreases from front to rear, and the grains are easy to accumulate in the front ⅔ part of the machine housing. The angle between the gain sliding plate and the horizontal plane is larger than the internal friction angle of the rice grains, which can ensure that the grains smoothly slide into the front cylinder screen. The grain distribution of the threshed mixtures from the longitudinal axial flow threshing device is that the grain content gradually increases from the middle to the both sides. By providing a first guide strip on the upper surface of the grain sliding plate, the threshed mixtures can be evenly fallen on the front cylindrical screen, which can reduce the cleaning load and improve the cleaning effect.
12. The combined harvester for the first season ratoon rice according to the present invention, the vertical space between the threshing drum and the cleaning screen is small, and the double-outlet cleaning fan, the grain sliding plate and the shaking plate divide the cleaning chamber into two areas, i.e. the upper and lower areas, and the rear half of the housing adopts the shaking plate to shake the threshed mixtures to the front cylindrical screen within a limited inclination angle, and leaves more vertical space. The gap between the shaking plate and the concave screen forms an air outlet, and in the process of falling off along the grain sliding plate and the shaking plate into the front cylinder screen, the threshed mixtures first passed through an air selection on the air outlet of the cleaning fan, so that the material is cleaned twice in a limited space, which improves the cleaning quality.

13. The control method of the multi-layered segmented-stubble cutter device according to the present invention has sensitive crop induction, is more accurate and efficient relative to the manual judgment, and has a flexible adjustment way, which greatly reduces the technical requirements for the operator and reduces the labor.

IN THE DRAWINGS

1—header; 1-1—rack; 1-2—small diameter auger; 1-3—ear cutter; 1-4—swing arm driving device; 1-5—divider; 1-6—anti-forward tilting reel; 1-6-1—wheel shaft; 1-6-2—pentagonal wheel frame; 1-6-3—parallel quadrangular drive mechanism; 1-6-4—reel element for first stubble; 1-6-4-1—reel rods; 1-6-4-2—reel boards; 1-6-4-3—reel rake teeth; 2—section-stubble cutter device; 2-1—segmenting cutter; 2-2—stubble cutter; 2-3—rectangular anti-collision tube; 3—panicle layer image acquisition device; 4—cutter height detection component; 4-1—first angle sensor; 4-2—second angle sensor; 4-3—third angle sensor; 5—cutter height control system; 6—conveying groove; 7—threshing and throwing integrated device; 7-1—threshing and crushing drum; 7-2—concave screen; 7-3—grass guide plate; 7-4—disc throwing device; 7-5—adjustable top cover of guide plate; 7-1-1—feeding section; 7-1-2—threshing section; 7-1-3—crushing section; 7-1-4—spiral feeding head; 7-1-5—threshing rack bar assembly; 7-1-6—nail teeth; 7-1-7—front web; 7-1-8—drum shaft; 7-1-9—intermediate web; 7-1-10—grass rack bar assembly; 7-1-11—grass moving cutter assembly; 7-1-12—rear wed; 7-4-1—throwing disc assembly; 7-4-2—throwing output shaft; 7-4-3—throwing input shaft; 7-4-4—throwing rack; 7-5-1—feeding section; 7-5-2—guide section; 7-5-3—fixed cutter section; 7-5-4—guide plate assembly; 7-5-5—top cover housing; 7-5-6—fixed cutter assembly; 7-5-7—guide adjustment assembly; 7-5-8—sliding plate; 7-5-9—guide plate; 8—double-cylinder screen cleaning device; 8-1—double-outlet cleaning fan; 8-3—double-cylinder screen; 8-4—grain sliding plate; 8-6—shaking plate; 8-6-1—second guide strip; 9—walking chassis; 9-1—chassis frame; 9-2—rice stubble low-loss crawler 9-2-1—crawler body; 9-2-2—narrow pattern; 9-3-1—rolling section; 9-3-2—low loss section; 10—grass stick; 10-1—grass stick frame; 10-2—height adjustment rod; 10-3—straw moving pipe; 11—gearbox; 12—cab; 13—first hydraulic cylinder; 14—second hydraulic cylinder; 15—third hydraulic cylinder.

EMBODIMENTS

The present invention is further described below with reference to the drawings and embodiments, but the protection scope of the present invention is not limited thereto.

Figure 1:
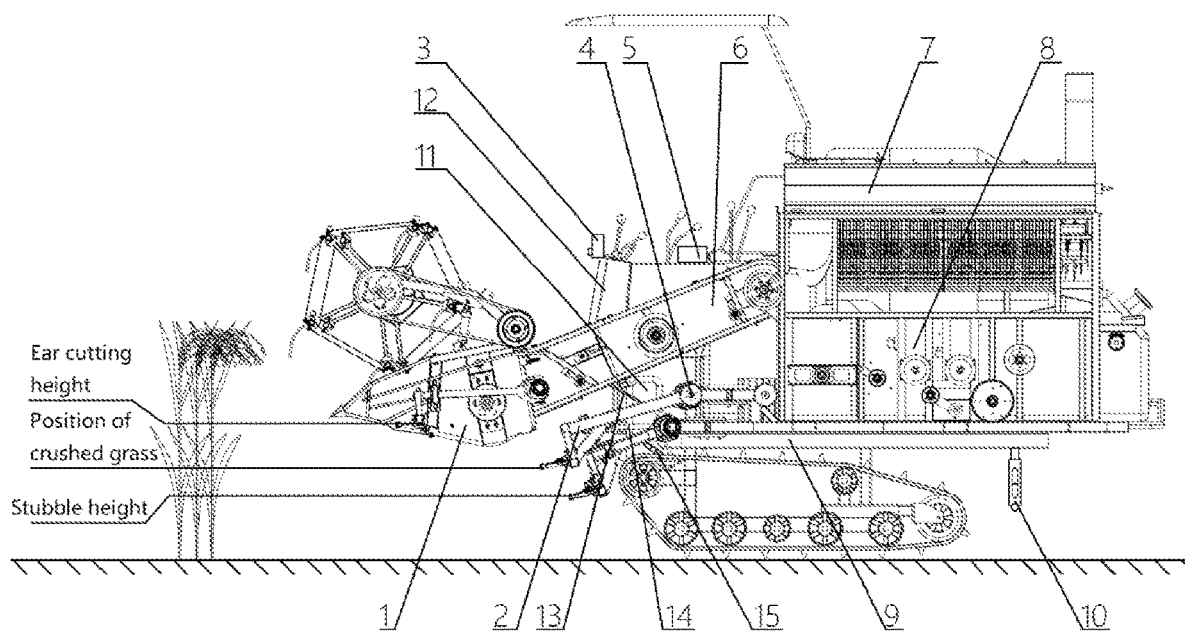
FIG. 1 is a schematic structural view of a combined harvester of the first season ratoon rice according to the present invention.
Figure 5:
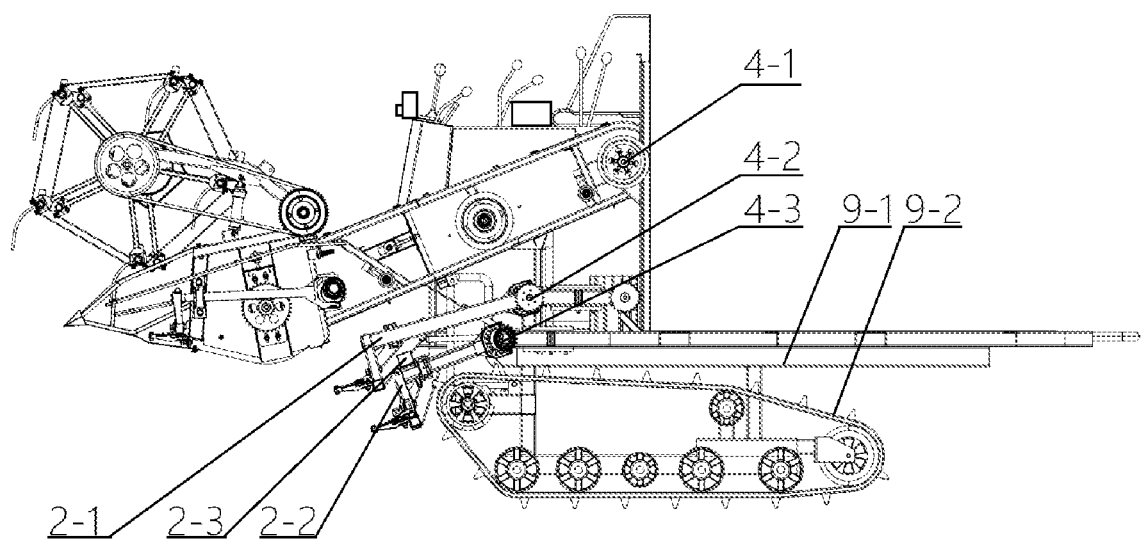
FIG. 5 is a schematic structural view of a multi-layer segmented-stubble cutter device for the first season ratoon rice according to the present invention.

As shown in FIG. 1 and FIG. 5, the multi-layer segmented-stubble cutter device for the first season ratoon rice according to the present invention includes a header 1, a segmenting cutter 2-1 and a stubble cutter 2-2. The header 1 is used to cut the ear of the ratoon rice. At least one segmenting cutter 2-1 is located at the lower rear of the header 1 and the segmenting cutter 2-1 is hinged on a walking chassis 9. The cutting height of the segmenting cutter 2-1 is controlled by a second actuator, for cutting the returning field stalk; the stubble cutter 2-2 is located at the lower rear of the segmenting cutter 2-1, and the stubble cutter 2-2 is hinged on the walking chassis 9 and the cutting height of the stubble cutter 2-2 is controlled by a third actuator, for cutting the stalk above the stubble. An anti-collision block 2-3 is installed on the stubble cutter 2-2, to prevent collision due to the small distance between the segmenting cutter 2-1 and the stubble cutter 2-2.

Figure 2:
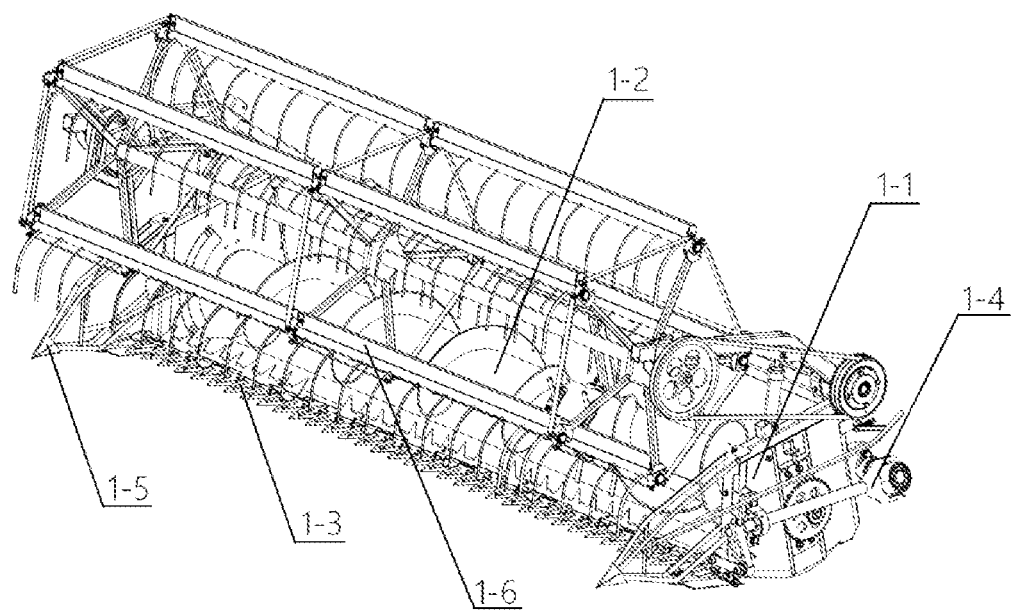
FIG. 2 is a structural view of a header according to the present invention.

As shown in FIG. 2, the header 1 includes a rack 1-1, a small diameter auger 1-2, an ear cutter 1-3, a swing arm driving device 1-4, dividers 1-5, and an anti-forward tilting reel 1-6. The small diameter auger 1-2 is installed inside the rack 1-1, and the ear cutter 1-3 is located at the front of the rack 1-1 and is driven by the swing arm driving device 1-4 installed on the side of the rack 1-1, the dividers 1-5 are symmetrically installed on both sides of the front end of the rack 1-1, and the anti-forward tilting reel 1-6 is installed above the rack 1-1. The header 1 has a cutting width of 2-2.6 m and is installed with the symmetry plane of the conveying groove 6 as the neutral plane. Correspondingly, the cutting width of each of the segmenting cutter 2-1 and the stubble cutter 2-2 is the same as that of the header 1. When the segmenting cutter 2-1 is in a horizontal position, it is 650-400 mm away from the ground, to meet the uniform segmentation of stalks with different lengths; when the stubble cutter 2-2 is in a horizontal position, it is 450-350 mm from the ground, to meet the height requirements of different varieties of the first season stubble of the ratoon rice. The ear cutter 1-3 and the section-stubble cutter assembly 2 are staggered from top to bottom and from front to rear, and a rectangular anti-collision tube 2-3 is welded to the stubble cutter 2-2, to prevent collision due to the small distance between the segmenting cutter 2-1 and the stubble cutter 2-2.

As shown in FIG. 1 and FIG. 5, the multi-layer segmented-stubble cutter device for the first season ratoon rice according to the present invention further includes a panicle layer image acquisition device 3, a cutter height detection component 4 and a cutter height control system 5;

The panicle layer image acquisition device 3 is installed at the front end of the cab 12, and the panicle layer image acquisition device 3 is configured to acquire an image of the ratoon rice;

The cutter height detection component 4 includes several sensors for detecting the cutting heights of the header 1, the segmenting cutter 2-1 and the stubble cutter 2-2 in real time respectively; in order to measure conveniently, the several sensors are angle sensors, for detecting the installation angles of the header 1, the segmenting cutter 2-1 and the stubble cutter 2-2 respectively; the first angle sensor 4-1 is installed at the hinge point of the conveying groove 6 and the threshing and throwing integrated device 7, the second angle sensor 4-2 is installed at the hinge point of the segmenting cutter 2-1 and the walking chassis 9; the third angle sensor 4-3 is installed at the hinge point of the stubble cutter 2-2 and the walking chassis 9.

The cutter height control system 5 determines the ear cutting height by analyzing the image of the ratoon rice; the stubble stalk height is determined manually, and the cutter height control system 5 determines the cutting height of the returning field stalk according to the ear cutting height and the stubble stalk height; the cutter height control system 5 controls the header 1, the segmenting cutter 2-1 and the stubble cutter 2-2 to reach the corresponding cutting height through the actuator. The first hydraulic cylinder 13 is used to rotate the header 1 around the hinge point of the conveying groove 6 and the threshing and throwing integrated device 7, and the second hydraulic cylinder 14 is used to rotate the segmenting cutter 2-1 around the hinge point of the segmenting cutter 2-1 and the walking chassis 9, and the third hydraulic cylinder 15 is used to rotate the stubble cutter 2-2 around the hinge point of the stubble cutter 2-2 and the walking chassis 9.

As shown in FIG. 1, the combined harvester for the first season ratoon rice according to the present invention includes a header 1, a segment-stubble cutter device 2, a panicle layer image acquisition device 3, a cutter height detection component 4, a cutter height control system 5, a conveying groove 6, a threshing and throwing integrated device 7, a double-cylinder screen cleaning device 8, a walking chassis 9, a grass stick 10, a gearbox 11 and a cab 12. The forward direction of the harvester is as the front, and the header 1 is located at the forefront of the combined harvester. The segment-stubble cutter device 2 is installed below the conveying groove 6 and hinged at the front end of the walking chassis 9. The panicle layer image acquisition device 3 is installed at the front end of the cab 12. The cutter height detection component 4 is installed at the hinge point of each cutter. The conveying groove 6 is connected to the header 1. The threshing and crushing integrated device 7 is connected to the conveying groove 6. The double-cylinder screen cleaning device 8 is located directly below the threshing and crushing integrated device 7; the grass stick 10 is installed at the rear end of the walking chassis 9, and the double-cylinder screen cleaning device 8, the gearbox 11 and the cab 12 are disposed directly above the walking chassis 9.

Figure 8:
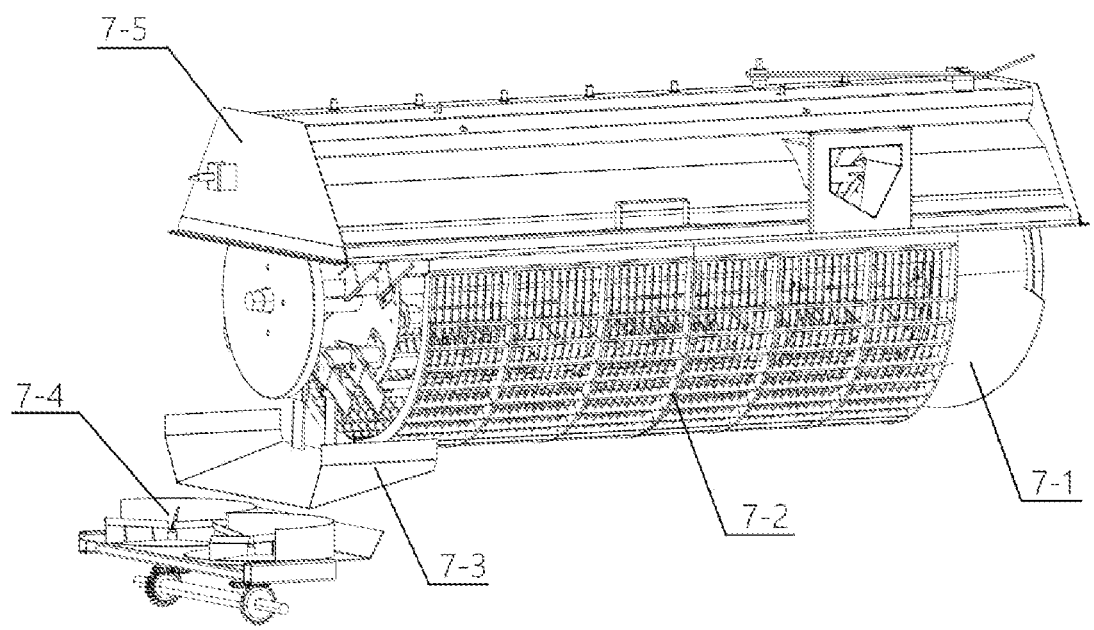
FIG. 8 is a structural view of a threshing, crushing and throwing integrated device according to the present invention.

As shown in FIG. 8, it includes a threshing and crushing drum 7-1, a concave screen 7-2, a grass guide plate 7-3, a disc throwing device 7-4, and an adjustable top cover 7-5 of guide plate. The threshing and crushing drum 7-1 includes a feeding section 7-1-1, a threshing section 7-1-2, and a crushing section 7-1-3; the concave screen 7-2 is located directly below the threshing and threshing section 7-1-2, the adjustable top cover 7-5 of guide plate is located above the threshing and crushing drum 7-1, the threshing section 7-1-2, the adjustable top cover 7-5 of guide plate and the concave screen 7-2 constitutes a threshing chamber; the concave screen 7-2 is a grid-type concave plate, and the header 1 is connected with the feeding section 7-1-1 by a conveying groove 6 for feeding the ratoon rice to the threshing chamber; the feeding section 7-1-1 is used to feed the ratoon rice to the threshing chamber; the crushing section 7-1-3 is located at the tail of the threshing section 7-1-2, for crushing stalks; the feeding section 7-1-1, the threshing section 7-1-2 and the crushing section 7-1-3 are coaxially installed on the drum shaft 7-1-8; the grass guide plate 3 is fixedly installed at the end of the concave screen 7-2, and is located directly below the crushing section 7-1-3 of the threshing and crushing drum. The disc throwing device 7-4 is located at the output of the crushing section 7-1-3, to throw the crushed grass to both sides of the threshing and crushing drum 7-1. In order to facilitate the crushed stalks to enter the disc throwing device 7-4 better, the grass guide plate 7-3 is inclined to the axis of the threshing and crushing drum 7-1, and the inclination angle is greater than 45°.

Figure 9:
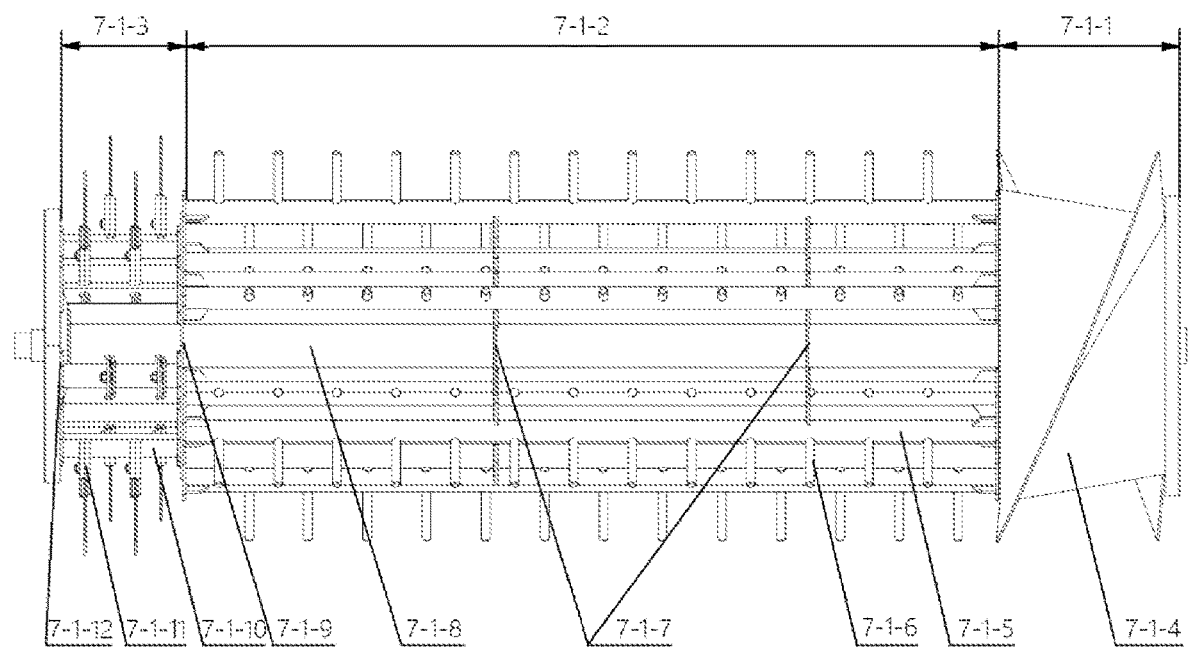
FIG. 9 is a structural view of a threshing and crushing drum of the threshing, crushing and throwing integrated device according to the present invention.

As shown in FIG. 9, the feeding section 7-1-1 is a spiral feeding head 7-1-4; the drum shaft 7-1-8 is coaxially installed with the spiral feeding head 7-1-4, an intermediate web 7-1-9 and a rear web 7-1-12 respectively; the threshing section 7-1-2 includes threshing rack bar assemblies 7-1-5, and the several threshing rack assemblies 7-1-5 are radially and evenly distributed between the intermediate web 7-1-1 and the spiral feeding head 7-1-4; a front web 7-1-7 is provided between the intermediate web 7-1-9 and the spiral feeding head 7-1-4, to support the threshing rack bar assemblies 7-1-5; nail teeth 7-1-6 are provided on any one of the threshing rack assemblies 7-1-5; the crushing section 7-1-3 includes the grass rack bar assemblies 7-1-10, and the several grass rack bar assemblies 7-1-10 are radially and evenly distributed between the intermediate web 7-1-9 and the rear web 7-1-12; a grass moving cutter assembly 7-1-11 is provided on any one of the grass rack bar assemblies 7-1-10. For better threshing and crushing the stalks, the radial angle between the nail teeth 7-1-6, the grass moving cutter assembly 7-1-11 and the threshing and crushing drum 7-1 is not greater than 12°.

Figure 10:
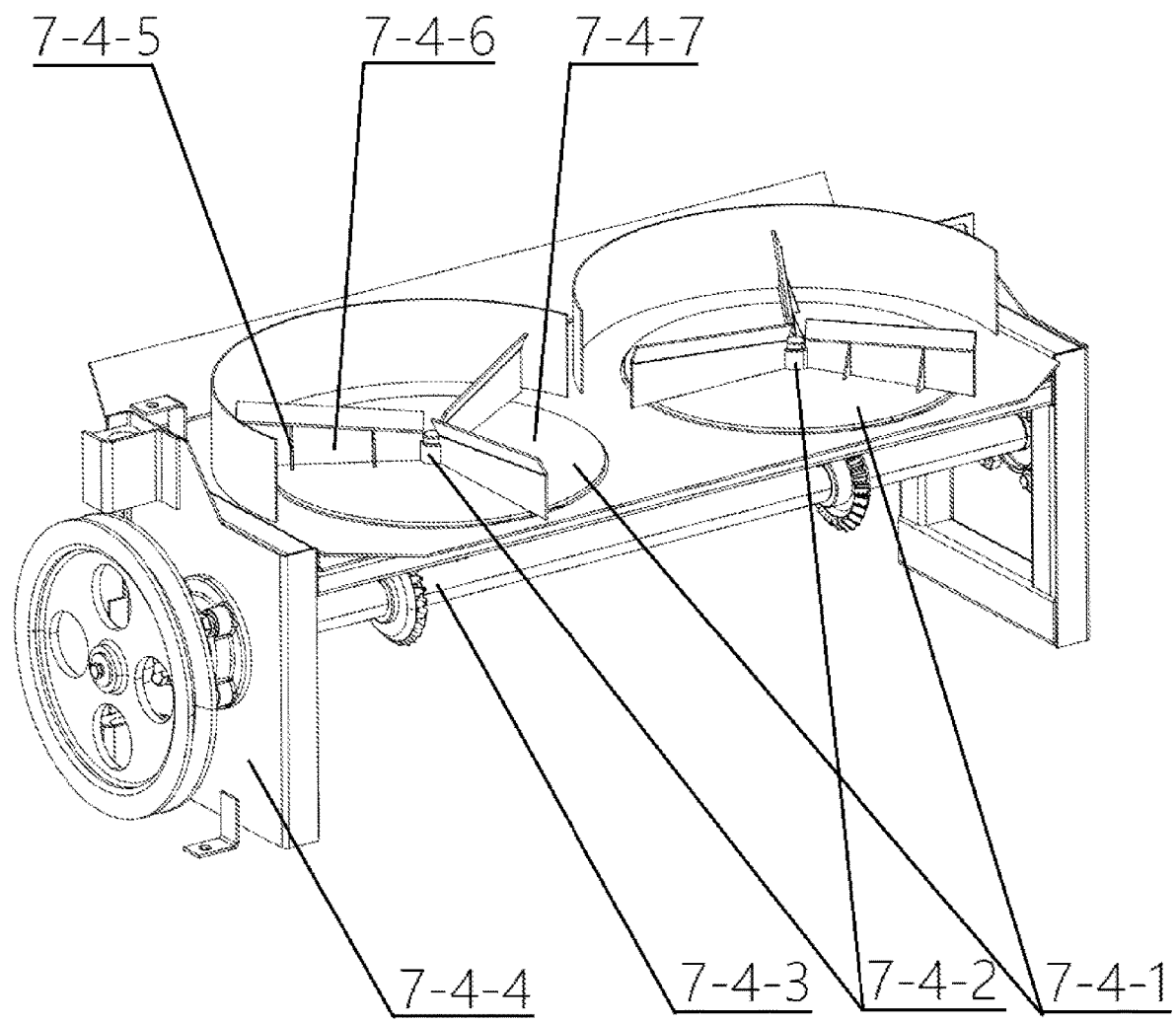
FIG. 10 is a structural view of a disc throwing device according to the present invention.

As shown in FIG. 10, the disc throwing device 7-4 includes a throwing disc assembly 7-4-1, a throwing output shaft 7-4-2, a throwing input shaft 7-4-3 and a throwing rack 7-4-4, the throwing disc assembly 7-4-1 and the throwing output shaft 7-4-2 are welded and installed above the throwing rack 7-4-4, and the throwing input shaft 7-4-3 is installed below the throwing rack 7-4-4 and is driven with the throwing output shaft 7-4-2 by a bevel gear. The throwing disc assembly 7-4-1 also includes a reinforcing rib 7-4-5, and a throwing disc side plate 7-4-6, and a throwing disc 7-4-7, wherein the number of throwing disc assembly 7-4-1 is two on the left and right, the rotating directions thereof are opposite and the rotation speeds thereof are equal, and each rotation speed is 300 rpm, and the bending direction of the throwing disc side plate 7-4-6 is the same as the direction of rotation. The line connecting the centers of both of the left and right throwing disc assemblies 7-4-1 is perpendicular to the drum shaft 7-1-8.

Figure 11:
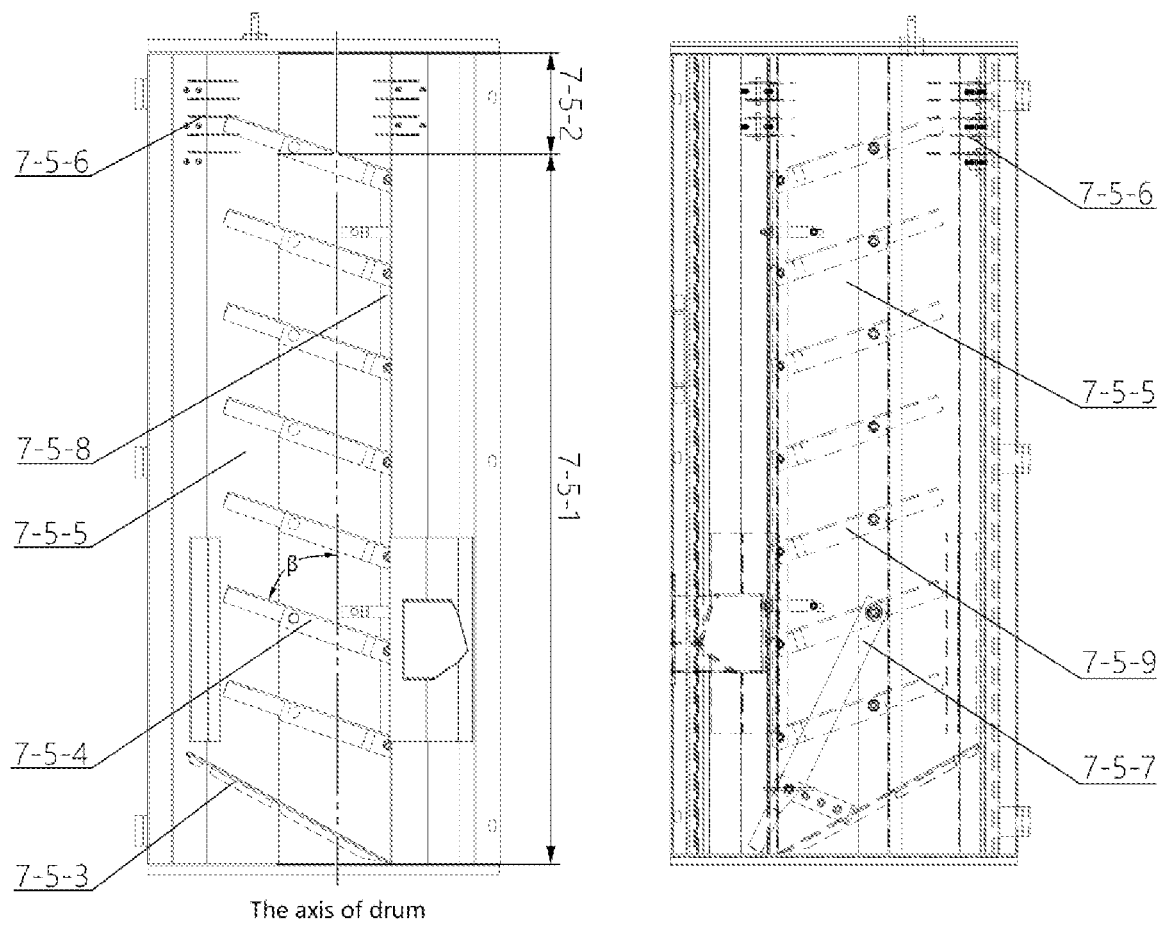
FIG. 11 is a structural view of an adjustable top cover of a guide plate according to the present invention.
Figure 16:
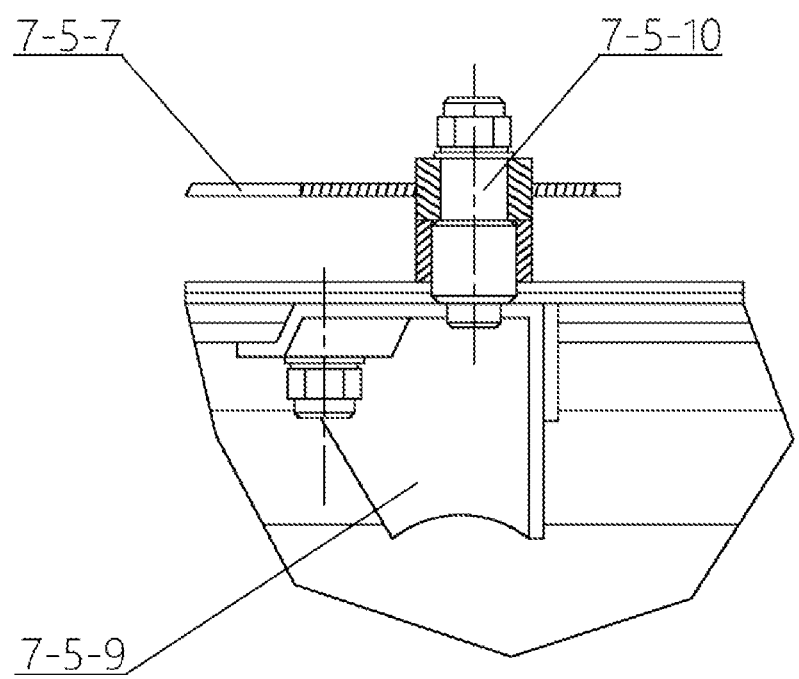
FIG. 16 is a sectional view of an adjustable top cover of a guide plate according to the present invention.
Figure 17:
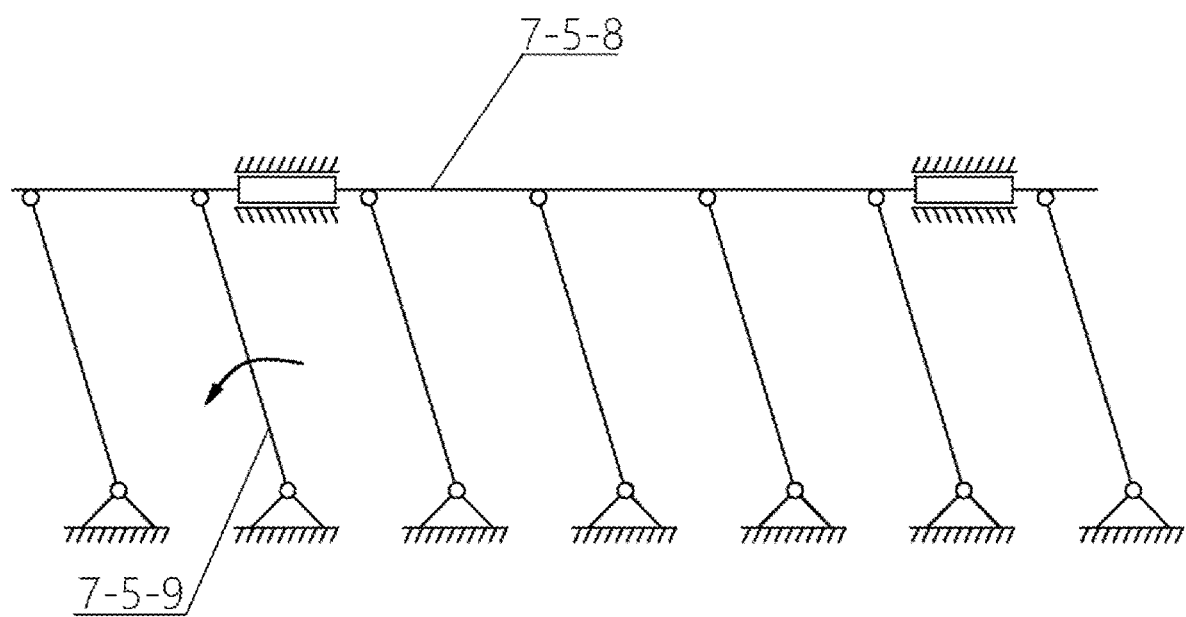
FIG. 17 is a schematic diagram of a guide adjustment plate according to the present invention.

As shown in FIG. 11, FIG. 16 and FIG. 17, the adjustable top cover 7-5 of guide plate includes a guide section 7-5-1 and a fixed cutter section 7-5-2, and the guide section 7-5-1 includes a front flip plate 7-5-3 and a guide adjustment plate 7-5-4; the front flip plate 7-5-3 is welded to the inside of the top cover housing 7-5-5, and the front flip plate 7-5-3 is located above the feeding section 7-1-1; the guide adjustment plate 7-5-4 is located above the threshing section 7-1-2, to guide the material into the crushing section 7-1-3. The angle between the guide adjustment plate 7-5-4 and the axis of the threshing and crashing drum 7-1 is changed by the external force; the guide section 7-5-1 includes a fixed cutter assembly 7-5-6, and the fixed cutter assembly 7-5-6 and the grass moving cutter assembly 7-1-11 are arranged in a staggered manner, for cutting the stalks together with the grass moving cutter assembly 7-1-11. The guide adjustment plate 7-5-4 includes guide plates 7-5-9, a sliding plate 7-5-8 and an adjustment plate 7-5-7; one end of several guide plates 7-5-9 is hinged to the inside of the housing of the adjustable top cover 7-5 of guide plate, the other end of the several guide plates 7-5-9 is hinged to the sliding plate 7-5-8 respectively; the sliding plate 7-5-8 can be slidably installed inside the housing of the adjustable top cover 7-5 of guide plate; the adjustment plate 7-5-7 is connected with any one of the guide plates 7-5-9 through a pin shaft 7-5-10, and the adjustment plate 7-5-7 is installed on the outside of the top cover housing 7-5-5; by rotating the adjustment plate 7-5-7 through external force, the angle between the several guide plates 7-5-9 and the axis of the threshing and crashing drum 7-1 is changed. The minimum gap between the guide plate 7-5-9 and the nail teeth 7-1-6 is 10 mm. The front flip plate 7-5-3 and the guide plate 7-5-9 are inclined to the axis of the threshing and crushing drum 7-1, and the inclined direction is related to the rotation direction of the threshing and crushing drum 7-1. The feeding end is as the front direction. Viewing from front to rear, when the threshing and crashing drum 7-1 rotates clockwise, the angle β is an acute angle, so that the material is finally guided to the fixed cutter section 7-5-2. By rotating the adjustment plate 7-5-7 to drive the pin shaft 7-5-10 to rotate, the guide plate 7-5-9 is rotated around the pin shaft 7-5-10, so that the angle β between the guide plate 7-5-9 and the axis of the threshing and crushing drum 7-1 is changed. Finally, the angle of the whole guide plate assembly 7-5-4 is adjusted by the sliding plate 7-5-8.

Figure 12:
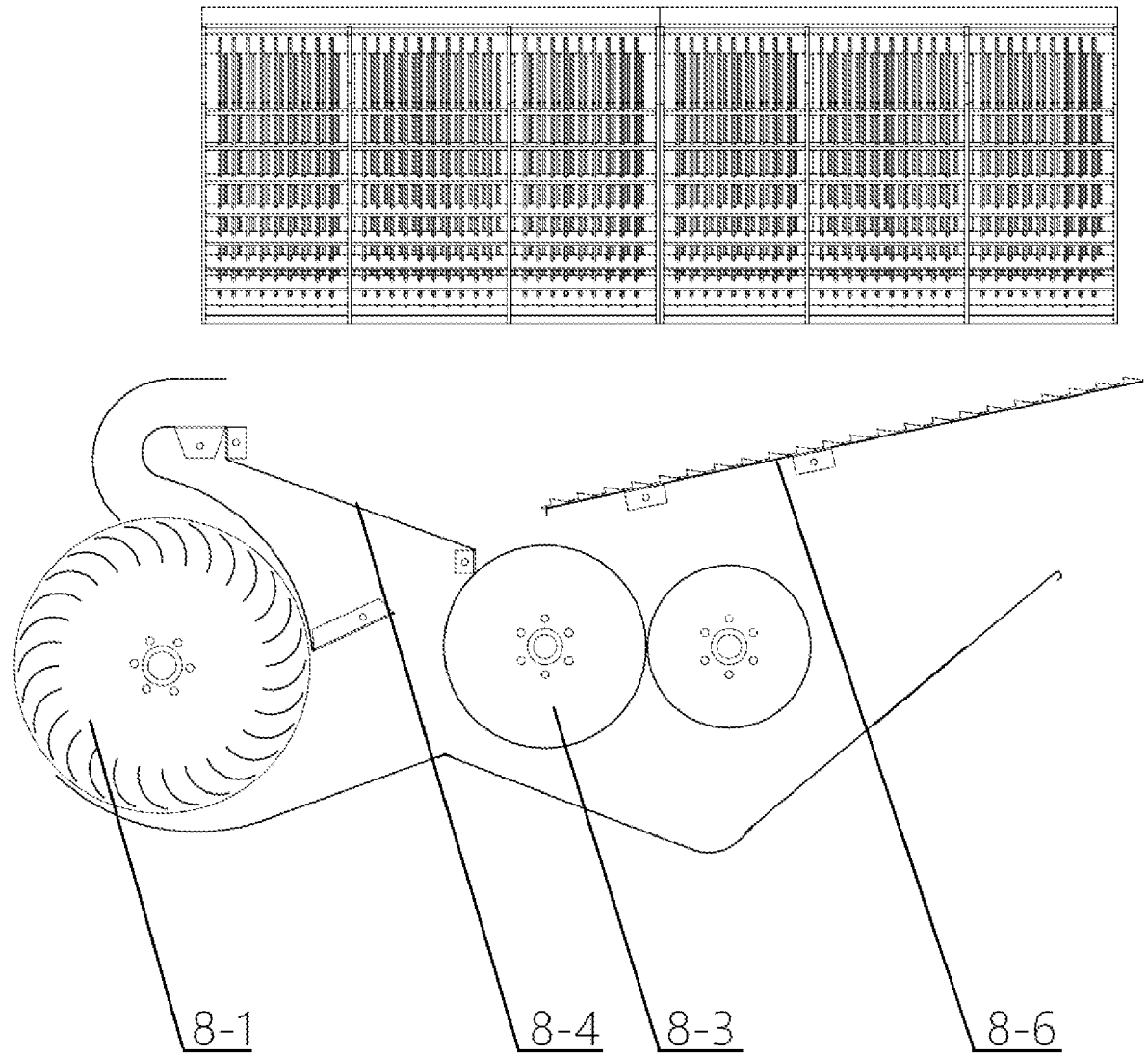
FIG. 12 is a structural view of a double-cylinder screen selecting device according to the present invention.
Figure 13:
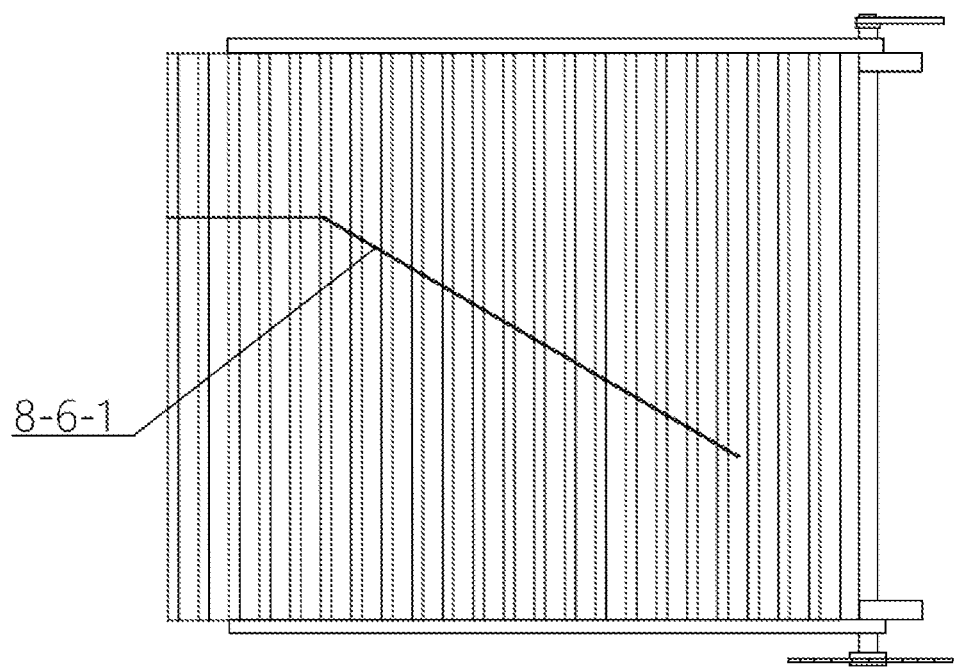
FIG. 13 is a structural view of a shaking plate of a double-cylinder screen cleaning device according to the present invention.

As shown in FIG. 12 and FIG. 13, the double-cylinder screen cleaning device 8 includes a double-cylinder screen 8-3 and a double-outlet cleaning fan 8-1. The lower air outlet of the double-outlet cleaning fan 8-1 is located in front of the double-cylinder screen 8-3, for cooperating with the double-cylinder screen 8-3 to blow large residues out of the machine; the upper air outlet of the double-outlet cleaning fan 8-1 is located above the double-cylinder screen 8-3, for blowing the light residues discharged from the threshing device out of the machine directly. The double-outlet cleaning fan 8-1 makes full use of the limited vertical space between the threshing device and the cleaning mechanism for preliminary air selection, which can reduce the design power of the cylindrical screen, use the fan reasonably and blow light residues directly out of the machine, without throwing through a cylindrical screen. The grain sliding plate 4 and the shaking plate 6 divide the cleaning room into an upper cleaning area and a lower cleaning area, and the upper cleaning area is used to directly blow the light residues discharged by the threshing device out of the machine; the lower clearing area is used to blow large residues out of the machine. A grain sliding plate 8-4 and a shaking plate 8-6 which form a funnel shape are provided between the double-cylinder screen 8-3 and the concave screen of the threshing device; the upper air outlet of the double-outlet cleaning fan 8-1 is located above the grain sliding plate 8-4. One end of the grain sliding plate 8-4 is located below the air outlet of the cleaning fan 8-1, and the other end of the grain sliding plate 8-4 extends to the edge of the double-cylinder screen 8-3; the angle between the plane formed by the end edge of the grain sliding plate 8-4 and the axis of the screen axis of the double-cylinder screen 8-3 and the horizontal plane is greater than 45°; the angle between the grain sliding plate 8-4 and the horizontal plane is greater than the internal friction angle of the threshed grain. Because the grain distribution of the threshed mixtures of the longitudinal axial flow threshing device is that the grain content gradually decreases from front to rear, and the grain is easy to accumulate in the front ⅔ part of the machine housing, and the angle between the gain sliding plate and the horizontal plane is larger than the internal friction angle of the rice grains, which can ensure that the grains smoothly slide into the front cylinder screen. One end of the shaking plate 8-6 is located below the other end of the threshing device, and the other end of the shaking plate 8-6 is located above the double-cylinder screen 8-3; a vibrating mechanism is provided at one end of the shaking plate 8-6, for shaking the shaking plate 8-6 between an angle of 10° to 25° with the horizontal plane. A first guide strip is provided on the grain sliding plate 8-4, to guide the material accumulated on both sides of the grain sliding plate 8-4 to the middle; a second guide strip 8-6-1 is provided on the shaking plate 8-6, to make blanking amount of the shaking plate 8-6 uniform in width. The second guide strip 8-6-1 divides the blanking opening of the shaking plate 8-6 into a first blanking opening and a second blanking opening; the width ratio of the first blanking opening and the second blanking opening is between 3:2 to 2:1; the angle between the second guide strip 8-6-1 and the horizontal direction is 20°-40°.

Figure 3:
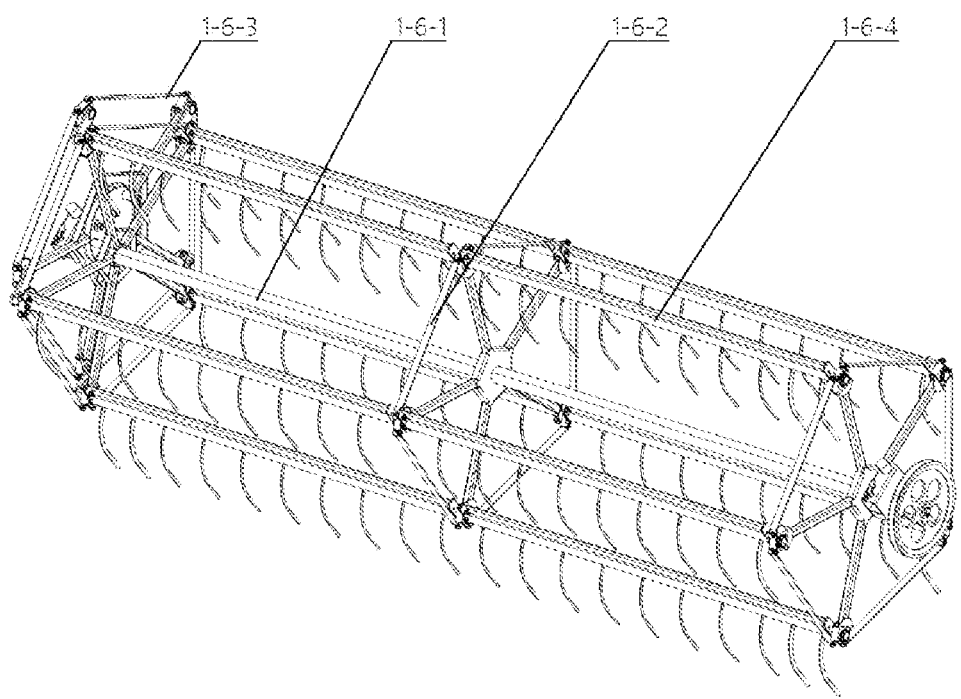
FIG. 3 is a structural view of an anti-forward tilting reel according to the present invention.
Figure 4:
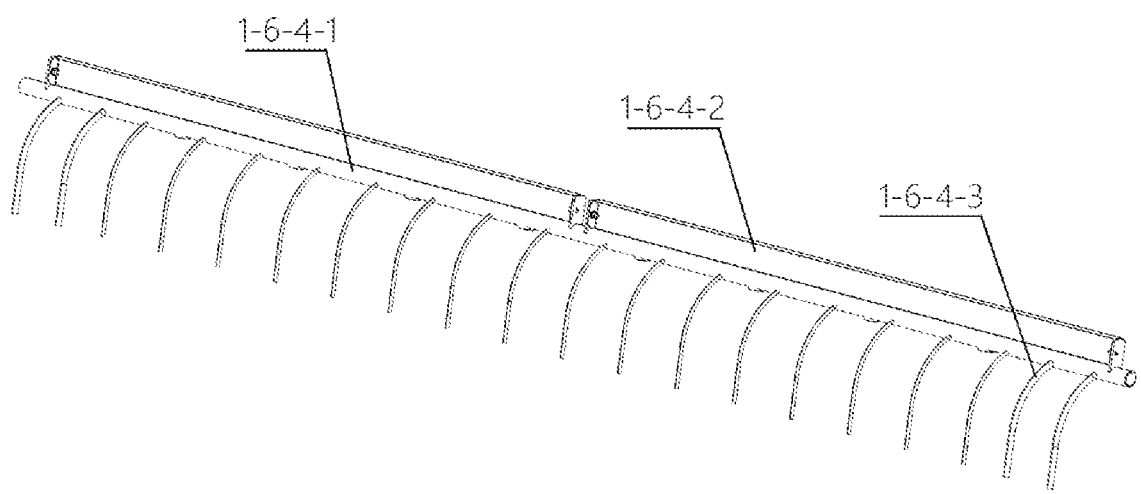
FIG. 4 is a structural view of a first stubble rice reel element according to the present invention.

As shown in FIG. 3 and FIG. 4, the header 1 is provided with an anti-forward tilting reel 1-6. The anti-forward tilting reel 1-6 includes a wheel shaft 1-6-1 and pentagonal wheel frames 1-6-2 and reel element 1-6-4 for first stubble; the several pentagon wheel frames 1-6-2 are evenly installed on the wheel shaft 1-6-1; the reel element 1-6-4 for first stubble includes a reel rod 1-6-4-1, a reel board 1-6-4-2, and a crop-mowing rake teeth 1-6-4-3, and the several crop-mowing rods 1-6-4-1 are connected between the adjacent pentagonal wheel frames 1-6-2; the several reel rake teeth 1-6-4-3 are evenly distributed along the axial direction below the crop-mowing rods 1-6-4-1. The reel board 1-6-4-2 is fixed to the reel rod 1-6-4-1 in the radial direction, to prevent the forward tilting of the first stubble after cutting. Wherein the reel board 1-6-4-2 is an iron plate with a width of 50 mm and a thickness of 1 mm, and the lower end thereof is close to the outer circle of the reel rod 1-6-4-1. The reel board 1-6-4-2 can effectively prevent the forward tilting of the first stubble after cutting. The combination of reel rods 1-6-4-1, reel boards 1-6-4-2 and reel rake teeth 1-6-4-3 can simultaneously support the fallen crops, ensure the cutting force and ensure that the crop does not tilt forward, and turn the cut crop to the auger of the header.

As shown in FIG. 5, the walking chassis 9 includes a chassis frame 9-1 and a rice low-loss crawler 9-2. The chassis frame 9-1 is installed with two rice low-loss crawlers 9-2. The rice low-loss crawler 9-2 includes a crawler body 9-2-1, and the outer surface of the crawler body 9-2-1 is equidistantly provided with narrow pattern 9-2-2 along the length of the crawler body 9-2-1.

Figure 14:
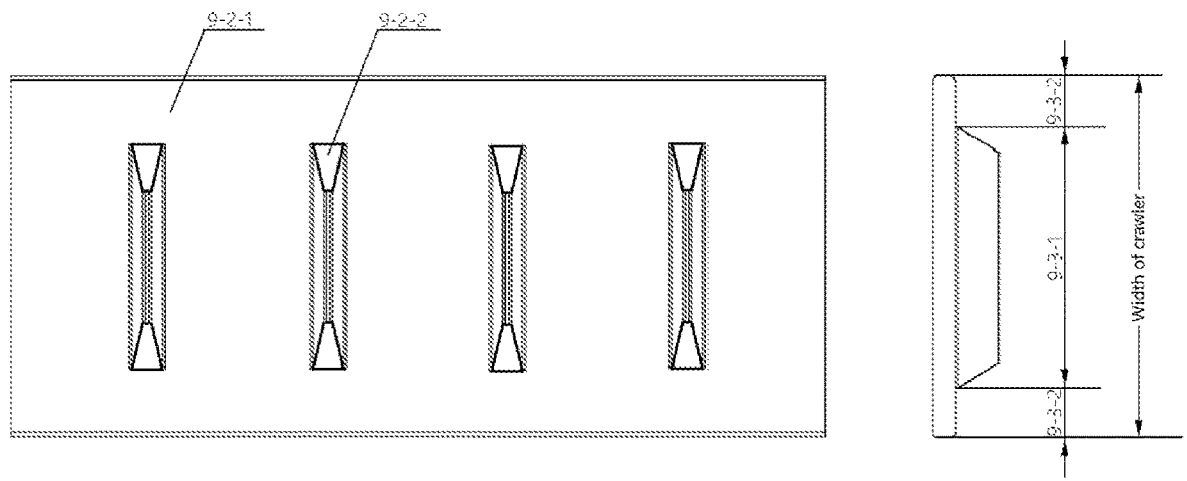
FIG. 14 is a schematic view of a crawler of a walking chassis and the rolling condition thereof according to the present invention.

As shown in FIG. 14, the narrow pattern 9-2-2 is centered in the width direction of the rice low-loss crawler body 9-2-1, and divides the crawler body 9-2-1 into a rolling section 9-3-1 and a low-loss section 9-3-2 in a width direction of the crawler body 9-2-1. The rolling section 9-3-1 provides traction for the walking of the harvester. The low-loss section 9-3-2 can reduce the ground specific pressure of the harvester, and the damage to the rice stubble is effectively reduced. The width of the crawler body 9-2-1 is in the range of 400-300 mm, the ratio of the length of the rolling section 9-3-1 to the low-loss section 9-3-2 is not less than 7:3.

Figure 15:
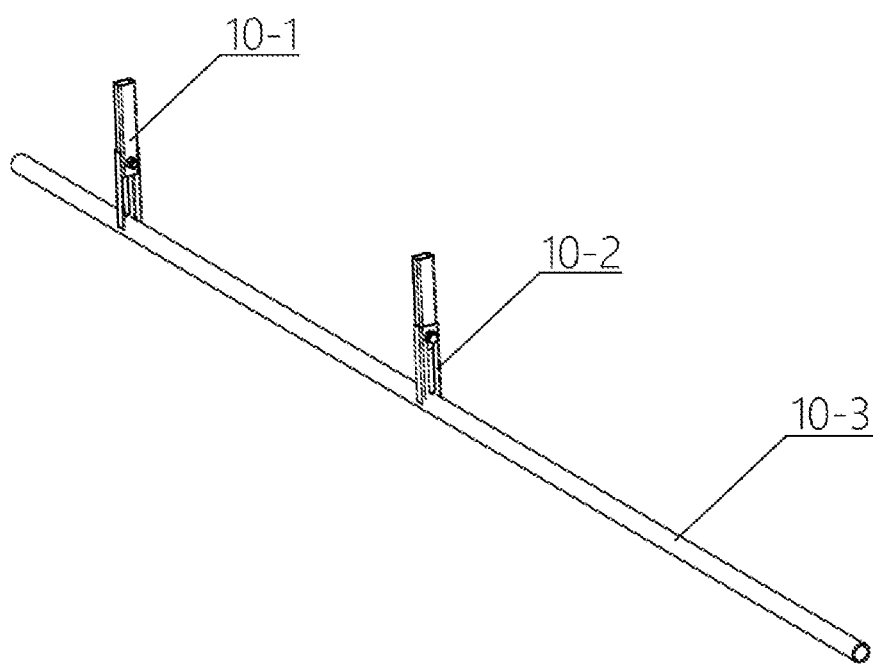
FIG. 15 is a structural view of a grass stick according to the present invention.

As shown in FIG. 15, the grass sticks 10 are installed on the rear of the walking chassis 9 symmetrically with the neutral surface of the header 1. The grass stick frames 10-1 are two rectangular tubes welded to the rear of the walking chassis 9; a U-shaped groove is provided on the height adjustment rod 10-2 to adjust the operating height; the length of the straw moving pipe 10-3 is increased by 20 mm on the basis of the cutting width of the header to ensure the straw moving effect, and the straw moving pipe 10-3 is in fastening connection with height adjustment rod 10-2 by bolt wherein the operating height thereof is in range of 200-400 mm.

When the first season rice stalk is too long, there can be two segmenting cutters 2-1 to shorten the length of stalk for returning field; the section-stubble cutter device 2 can be installed on the front of the walking chassis 9 and below the conveying groove, or can be installed separately: the position of the segmenting cutter 2-1 remains unchanged, and the stubble cutter 2-2 is installed at the rear of the walking chassis 9 and behind the rice low-loss crawler 9-2.

The air flow parameters in the cylindrical screen cleaning device 8 should be set according to the composition of the product threshed from ratoon rice. At the same time, air flow type, air screen type, and air cleaning barrel type cleaning devices can be used.

Figure 6:
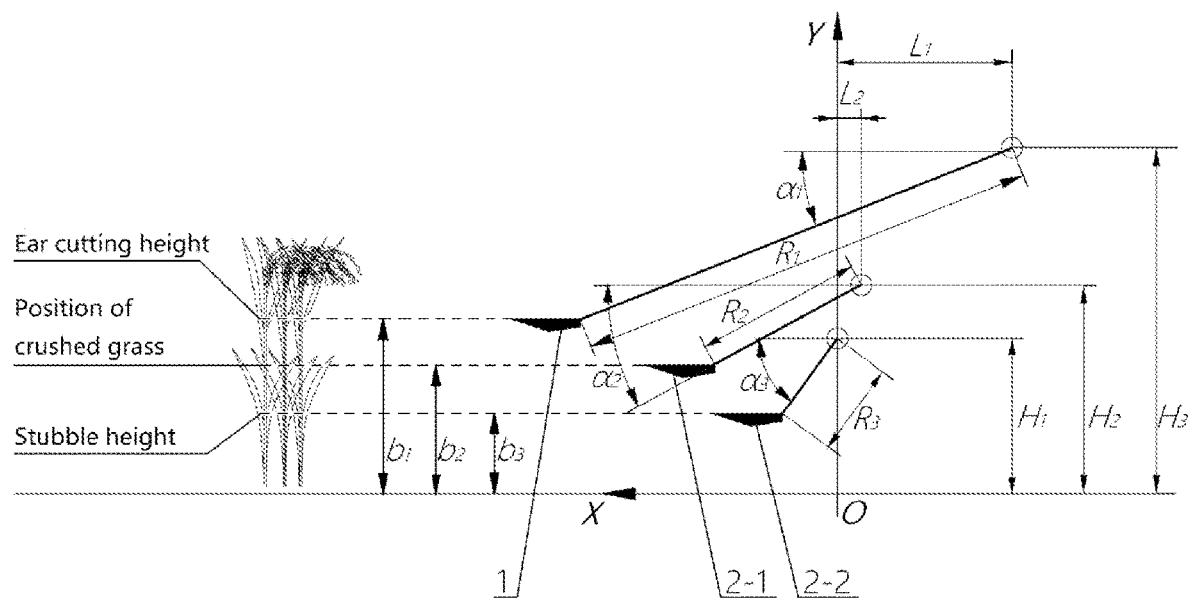
FIG. 6 is a calculation schematic view of a control method of a multi-layer segment-stubble cutter device according to the present invention.
Figure 7:
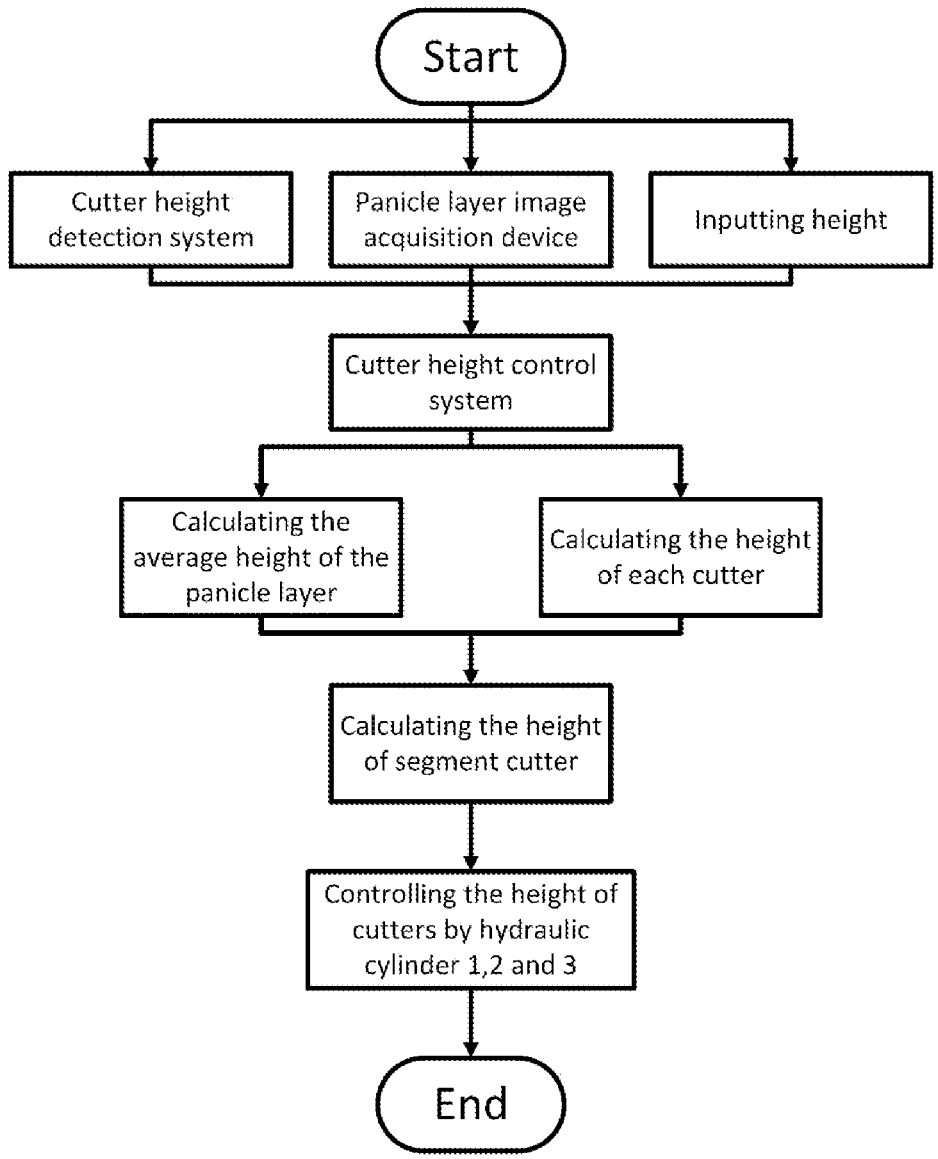
FIG. 7 is a flowchart of a control method of a multi-layer segment-stubble cutter device according to the present invention.

As shown in FIG. 5, FIG. 6 and FIG. 7, the control method of the multi-layer segmented-stubble cutter device according to the present invention includes the following steps:

S1: The line passing the hinge point of the stubble cutter 2-2 and perpendicular to the horizontal ground intersects with the horizontal ground, and the intersected point is the origin O and a coordinate system is established. The forward direction of the machine is the positive direction of the X axis, and the direction passing the hinge point of the stubble cutter 2-2 is the positive direction of the Y axis. The coordinates of the header 1 are x1 and y1; the coordinates of the segmenting cutter 2-1 are x2 and y2; the coordinates of the stubble cutter 2-2 are x3 and y3. The rotating radii of the header 1, the segmenting cutter 2-1 and the stubble cutter 2-2 are R1, R2, and R3 respectively; the angles of the header 1, the segmenting cutter 2-1 and the stubble cutter 2-2 with the horizontal plane are α1, α2, and α3 respectively; the height of the header 1, the segmenting cutter 2-1 and the stubble cutter 2-2 from the ground are H1, H2, and H3 respectively; the horizontal distance between the header 1 and the stubble cutter 2-2 and the horizontal distance between the segmenting cutter and the stubble cutter 2-2 2-2 are L1 and L2 respectively, and each angle α1, α2, and α3 is obtained through the first angle sensor 4-1, the second angle sensor 4-2, and the third angle sensor 4-3, and the following equations are used to calculate the coordinate values of each cutter.

Let matrix A $$A = \begin{bmatrix} x_1 & y_1 \\ x_2 & y_2 \\ x_3 & y_3 \end{bmatrix} = \begin{bmatrix} R_1 \cdot \cos\alpha_1 + L_1 & H_1 - R_1 \cdot \sin\alpha_1 \\ R_2 \cdot \cos\alpha_2 + L_2 & H_2 - R_2 \cdot \sin\alpha_2 \\ R_3 \cdot \cos\alpha_3 & H_3 - R_3 \cdot \sin\alpha_3 \end{bmatrix}$$

S2: Let matrix B $$B = \begin{bmatrix} 0 & b_1 \\ 0 & b_2 \\ 0 & b_3 \end{bmatrix}$$

Wherein, b1 is the ear cutting height, b2 is the segmented position, and b3 is the stubble height.

The height of the stubble is determined by sampling on site and measuring the average height of the second to last rice node of ratoon rice and recorded as b3.

S3: The panicle layer image acquisition device 3 installed at the front end of the cab 12 acquires an image of unharvested rice in front of the harvester, and the ear cutting height is determined by an image processing method, and recorded as b1.

S4: In order to make the stalk between the ear and the stubble be not too long, the segmenting cutter 2-1 should be located at the half position between the ear cutter 1-3 of the header 1 and the stubble cutter 2-2, then b2 is calculated as:

$$b_2 = \frac{b_1 - b_2}{2} + b_3 = \frac{b_1 + b_3}{2}$$

S5: Let y1=b1, y2=b2 and y3=b3, and the angle of each cutter is controlled by controlling the extension rods of the first hydraulic cylinder 13, the second hydraulic cylinder 14 and the third hydraulic cylinder 15 respectively, to achieve the automatic control of each cutter; if the operator intervenes manually, the cutter height control system exits directly, otherwise it returns to S1.

The above examples are preferred embodiments of the present invention, but the present invention is not limited to the above-mentioned embodiments. Without departing from the essence of the present invention, any obvious improvement, replacement, or modification made by the person skilled in the art should all belong to the protection scope of the present invention.

The invention claimed is:

1. A multi-layer segmented-stubble cutter device for first season ratoon rice, comprising
  a header, at least one segmenting cutter and a stubble cutter, wherein the header is used to cut the ear of ratoon rice and a first cutting height of the header is controlled by a first actuator;

the at least one segmenting cutter for cutting returning field stalks is located at a lower rear of the header, is hinged on a walking chassis, and a second cutting height of the at least one segmenting cutter is controlled by a second actuator;

the stubble cutter for cutting above stubbles of the returning field stalks is located at a lower rear of the at least one segmenting cutter, is hinged on the walking chassis, and a third cutting height of the stubble cutter is controlled by a third actuator, and further comprising a panicle layer image acquisition device, a cutter height detection component, and a cutter height control system; wherein the panicle layer image acquisition device is configured to acquire an image of ratoon rice, the cutter height detection component comprises a plurality of sensors for detecting the first cutting height, the second cutting height, and the third cutting height in real time;

the cutter height control system determines an ear cutting height by analyzing the image of ratoon rice, a stubble stalk height is determined manually, and the cutter height control system determines a returning field stalk cutting height based on the ear cutting height and the stubble stalk height;

and further wherein the cutter height control system controls the header to reach the first cutting height via the second actuator, the segmented cutter to reach the second cutting height via the second actuator, and the stubble cutter to reach the third cutting height via the third actuator.

2. The multi-layer segmented-stubble cutter device according to claim 1, wherein an anti-collision block is installed on the stubble cutter to prevent collision of the segmenting cutter and the stubble cutter.

3. The multi-layer segmented-stubble cutter device according to claim 1, wherein, the plurality of sensors are angle sensors for detecting a first installation angle of the header, a second installation angle of the segmenting cutter and a third installation angle of the stubble cutter; the cutter height control system determines the first cutting height of the header, the second cutting height of the segmenting cutter and the third cutting height of the stubble cutter based on the first installation angle of the header, the second installation angle of the segmenting cutter and the third installation angle of stubble cutter and a turning radii of the header, the segmenting cutter and the stubble cutter.

4. A combined harvester for first season ratoon rice, comprising the multi-layer segmented-stubble cutter device according to claim 1.

5. The combined harvester for first season ratoon rice according to claim 4, further comprising a threshing and crushing drum and a disc throwing device, the threshing and crushing drum comprises a feeding section, a threshing section and a crushing section; the threshing section is used to form a threshing chamber with a concave screen; the header is connected to the feeding section, for feeding the ratoon rice to the threshing chamber;

the crushing section is located at a tail of the threshing section, for crushing the stalks; the feeding section, the threshing section and the crushing section are coaxially installed on a shaft of the drum; the disc throwing device is located at the output end of the crushing section, for throwing crushed grass to a first side and a second side of the threshing and crushing drum.

6. The combined harvester for first season ratoon rice according to claim 5, wherein, the disc throwing device comprising a throwing disc assembly, a throwing output shaft, a throwing input shaft and a throwing rack; the throwing rack is provided with the throwing disc assembly, the throwing output shaft and the throwing input shaft of the throwing disc assembly are drive-connected, for rotating the throwing disc assembly around the throwing output shaft; and wherein the throwing input shaft is installed on the throwing rack.

7. The combined harvester for first season ratoon rice according to 6, wherein the throwing disc assembly comprises two throwing disc assemblies, wherein each throwing disc assembly of the two throwing disc assemblies rotate in opposite directions relative to each other; and wherein each throwing disc assembly of the two throwing disc assemblies includes a reinforcing rib, a throwing disc side plate and a throwing disc; the throwing disc is fixedly connected to the throwing output shaft; the throwing disc side plates are evenly distributed on the throwing disc, the reinforcing rib is provided on the throwing disc side plate; and wherein the throwing output shaft is engaged with the throwing input shaft through a bevel gear.

8. The combined harvester for first season ratoon rice according to claim 5, further comprising an adjustable top cover of a guide plate, the adjustable top cover of the guide plate comprising a guide section and fixed cutter section, the guide section comprising a front flip plate and a guide adjustment board;

wherein the front flip plate is located above the feeding section for guiding material into the threshing section; the guide adjustment plate is located above the threshing section, for guiding the material into the crushing section; an angle between the guide adjustment plate and an axis of the threshing and crushing drum is changed by external force; the fixed cutter section comprises a fixed cutter assembly, and the fixed cutter assembly and a grass moving cutter assembly are arranged in a staggered manner, for cutting the stalks with the grass moving cutter assembly.

9. The combined harvester for first season ratoon rice according to claim 8, wherein the guide adjustment plate comprises guide plates and sliding plates and adjustment plates; one end of each of the guide plates is hinged inside the housing of the adjustable top cover of the guide plate, and the other end of each of the plurality of guide plates is hinged with the sliding plate respectively; the sliding plate is slidably installed in the housing of the adjustable top cover of the guide plate; the adjustment plate is connected to any one of the guide plates, and the adjustment plate is rotated by external force to change angle between the plurality of guide plates and the axis of the threshing and crushing drum.

10. The combined harvester for first season ratoon rice according to claim 4, further comprising a double-cylinder screen cleaning device, which comprises a double-cylinder screen and a double-outlet cleaning fan, wherein the lower outlet of the double-outlet cleaning fan is located in a front of the double-cylinder screen for blowing large residues out of the combined harvester for first season ratoon rice in conjunction with the double-cylinder screen; and an upper air outlet of the double-outlet cleaning fan is located above the double-cylinder screen for blowing light residues discharged by the threshing device directly out of the combined harvester for first season ratoon rice.

11. The combined harvester for first season ratoon rice according to claim 10, further comprising a grain sliding plate and a shaking plate, wherein the grain sliding plate and the shaking plate divide a clearing room into an upper clearing area and a lower clearing area, the upper clearing area is used to directly blow the light residues discharged by the threshing device out of the combined harvester season ratoon rice; and the lower clearing area is used to blow the large residues out of the combined harvester for first season ratoon rice.

12. The combined harvester for first season ratoon rice according to claim 11, wherein the grain sliding plate and the shaking plate form a funnel shape and are provided between the double-cylinder screen and the threshing device; a first end of the grain sliding plate is located below the upper air outlet of the cleaning fan, and a second end of the grain sliding plate extends to an edge of the double-cylinder screen;

wherein a first end of the shaking plate is located below a first end of the threshing device, and a second end of the shaking plate is located above the double-cylinder screen; and a vibrating mechanism is provided on one end of the shaking plate for shaking the shaking plate in an angle between 10° to 25° with a horizontal plane.

13. The combined harvester for first season ratoon rice according to claim 11, wherein, a first guide strip is provided on the grain sliding plate, for guiding material accumulated on a first side and a second side of the grain sliding plate to a middle of the grain sliding plate; and a second guide strip is provided on the shaking plate for making a blanking amount of the shaking plate uniform in width.

14. The combined harvester for first season ratoon rice according to claim 13, wherein the second guide strip divides a blanking opening of the shaking plate into a first blanking opening and a second blanking opening;

wherein a width ratio of the first blanking opening and the second blanking opening is 3:2-2:1; and an angle between the second guide strip and the horizontal direction is 20° -40°.

15. The combined harvester for first season ratoon rice according to claim 4, wherein, the header is provided with an anti-forward tilting reel, and the anti-forward tilting reel comprises a wheel shaft, pentagonal wheel frames and a reel element for a first stubble;

wherein the pentagonal wheel frames are evenly installed on the wheel shaft; the reel element for the first stubble comprises several reel rods, a reel board and several reel rake teeth, and the several reel rods are connected between adjacent pentagonal wheel frames of the pentagonal wheel frames; the several reel rake teeth are evenly distributed along an axial direction below the seveeral reel rods, and the reel board is fixed to at least one reel rod of the several reel rods in a radial direction, to prevent a forward tilting of the first stubble after cutting.

16. The combined harvester for first season ratoon rice according to claim 4, wherein the walking chassis is a crawler-type walking chassis, and a crawler body of the crawler-type walking chassis is provided with a narrow pattern having a first width smaller than a second width of the crawler body.

17. The combined harvester for first season ratoon rice according to claim 16, wherein the narrow pattern is located in a middle of the crawler body, and the narrow pattern divides the crawler body into a rolling section and a low-loss section in a direction of the second width, and the rolling section is used to provide traction; and wherein the low-loss section is used to reduce ground specific pressure.

18. The combined harvester for first season ratoon rice according to claim 17, wherein the, second width of the crawler body is in a range of 300-400 mm; and a ratio of a first length of the rolling section to a second length of the low-loss section is not less than 7:3.

19. The combined harvester for first season ratoon rice according to claim 4, further comprising a grass stick, wherein the grass stick is adjustable in height and installed on the walking chassis for dropping the stalk that fell on a stubble to a ground after cutting.

20. A control method of a multi-layer segmented-stubble cutter device comprising a controller, a header, at least one segmenting cutter and a stubble cutter, comprising the following steps:

acquiring a ratoon rice image of ratoon rice, and determining an ear cutting height $b_1$ according to the ratoon rice image based on an image processing method;

determining a height $b_3$ of a stubble stalk by sampling on site and measuring an average height of a second to last rice node of the ratoon rice;

determining a cutting height $b_2$ of a returning field stalk according to the ear cutting height $b_1$ and the height $b_3$ of the stubble stalk;

controlling the header to the ear cutting height $b_1$ by a first actuator and several sensors;

controlling the segmenting cutter to the cutting height $b_2$ of the returning field stalk by a second actuator and the several sensors;

controlling the stubble cutter to the height $b_3$ of the stubble stalk by a third actuator and the several sensors.

* * * * *